(12) United States Patent
Sharkey, Jr. et al.

(10) Patent No.: US 7,883,626 B2
(45) Date of Patent: Feb. 8, 2011

(54) METHOD FOR THE TREATMENT OF ACID MINE DRAINAGE

(75) Inventors: William S. Sharkey, Jr., Munhall, PA (US); Paul J. Baker, Fairmont, WV (US)

(73) Assignee: Waterways Restoration Group, Inc., Munhill, PA (US)

( * ) Notice: Subject to any disclaimer, the term of this patent is extended or adjusted under 35 U.S.C. 154(b) by 0 days.

(21) Appl. No.: 12/842,114

(22) Filed: Jul. 23, 2010

(65) Prior Publication Data

US 2010/0282686 A1  Nov. 11, 2010

Related U.S. Application Data

(62) Division of application No. 12/263,630, filed on Nov. 3, 2008, now Pat. No. 7,784,620.

(60) Provisional application No. 60/985,384, filed on Nov. 5, 2007.

(51) Int. Cl.
*C02F 1/66* (2006.01)
*C02F 1/72* (2006.01)

(52) U.S. Cl. .................. 210/743; 210/747; 210/759

(58) Field of Classification Search .......... 210/702, 210/821, 722, 724, 739, 743, 747, 749, 758, 210/759, 170.03, 170.07, 170.08, 170.1, 210/501, 503, 505, 506, 508, 510.1; 405/128.15, 405/128.45, 128.5; 502/404; 252/181, 186.3; 162/147, 181.2, 181.7

See application file for complete search history.

(56) References Cited

U.S. PATENT DOCUMENTS 6,893,570 B1 * 5/2005 Hilton et al. ................ 210/667

* cited by examiner

*Primary Examiner*—Matthew O Savage
*Assistant Examiner*—Lucas Stelling
(74) *Attorney, Agent, or Firm*—McKay & Associates, P.C.

(57) ABSTRACT

A process for neutralizing acid mine drainage which includes a neutralizer and binder component consisting of steel slag in an amount of 75% to 95% by weight of the agglomeration, a sodium carbonate selected from the group consisting of soda ash and pulp liquor in an amount of 0.5% to 25% of the agglomeration, and, optionally, a lime component selected from the group consisting of limestone sand and slag. Further included is a dissolution control and filtration component consisting of an organic material in an amount of 0.24% to 15% by weight of the agglomeration selected from the group consisting of recycled newsprint, sphagnum peat moss, and sawdust. Next is a dispersant and neutralizer component consisting of a surfactant in an amount of 0.01% to 0.075% by weight of the agglomeration. The agglomeration may further comprise an oxidation component such as calcium peroxide, potassium permanganate, and hydrogen peroxide.

7 Claims, 5 Drawing Sheets

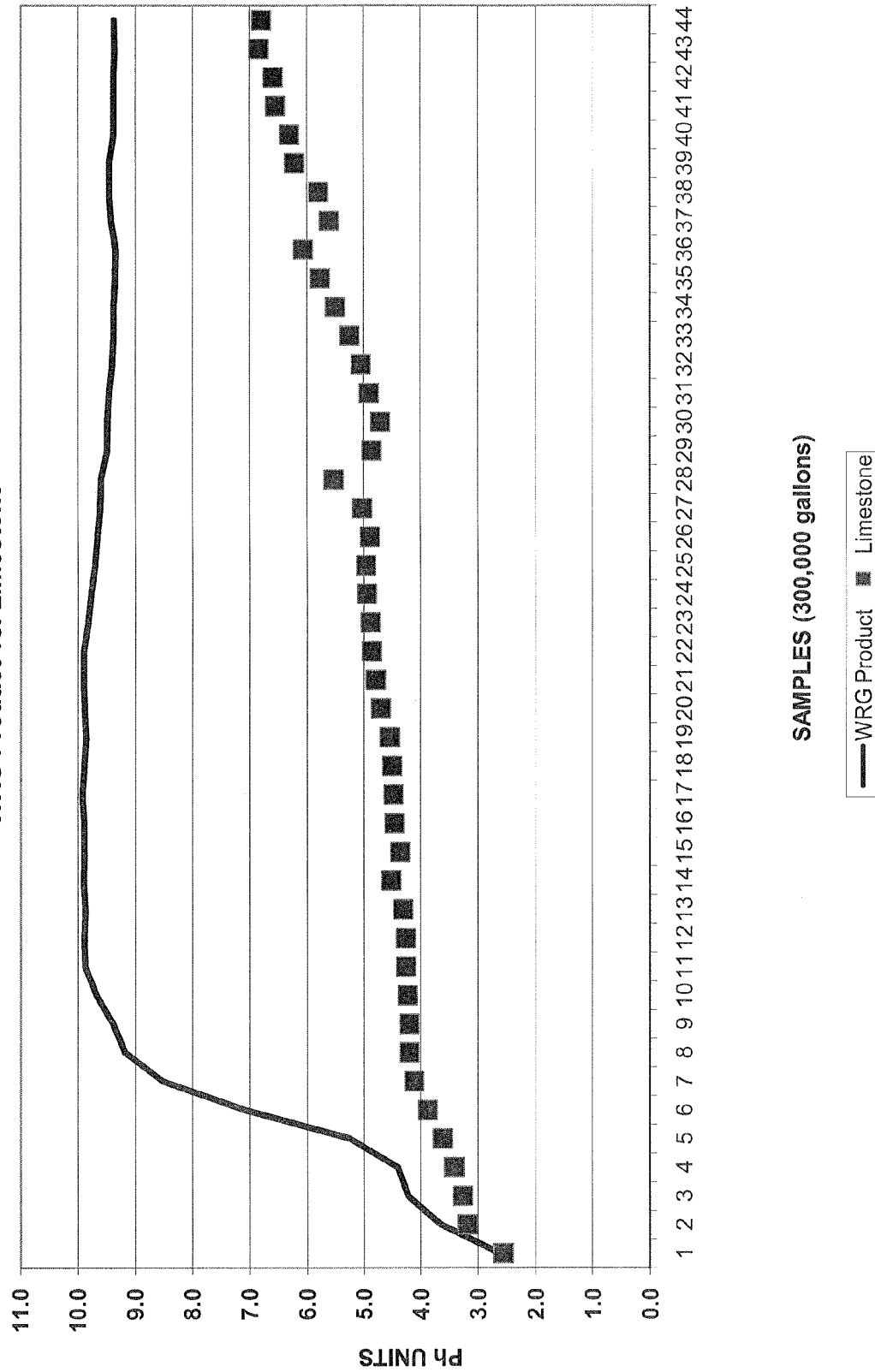

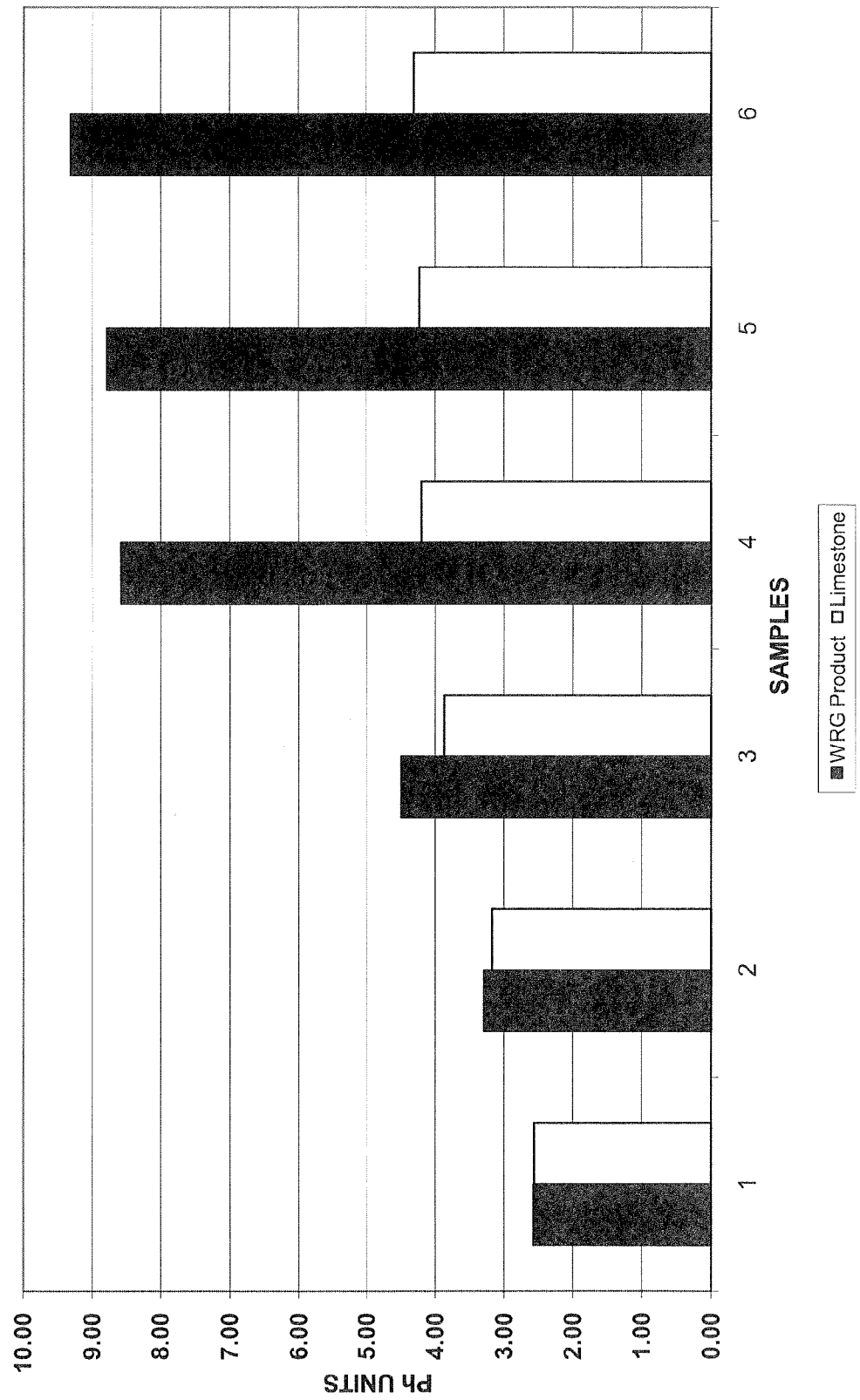

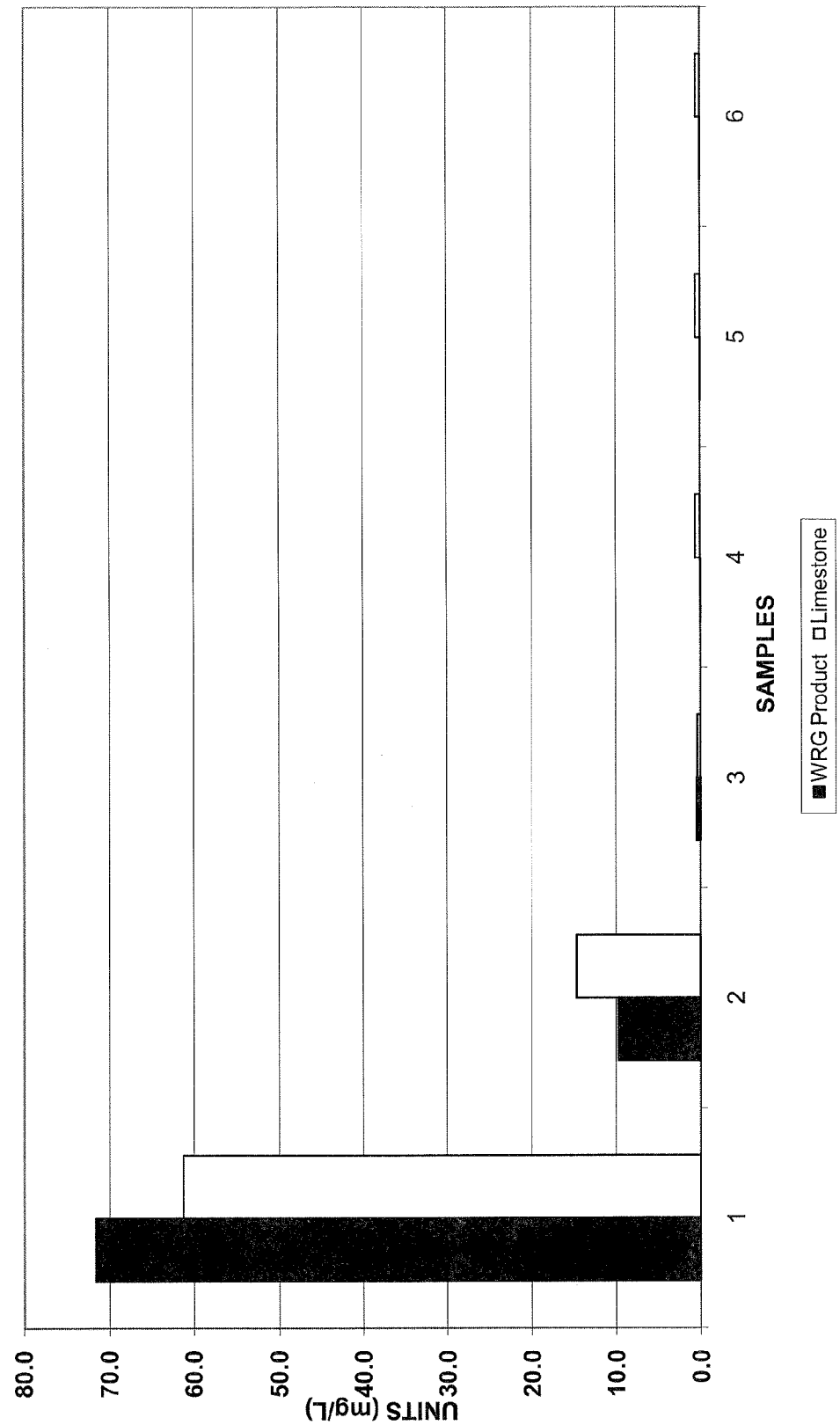

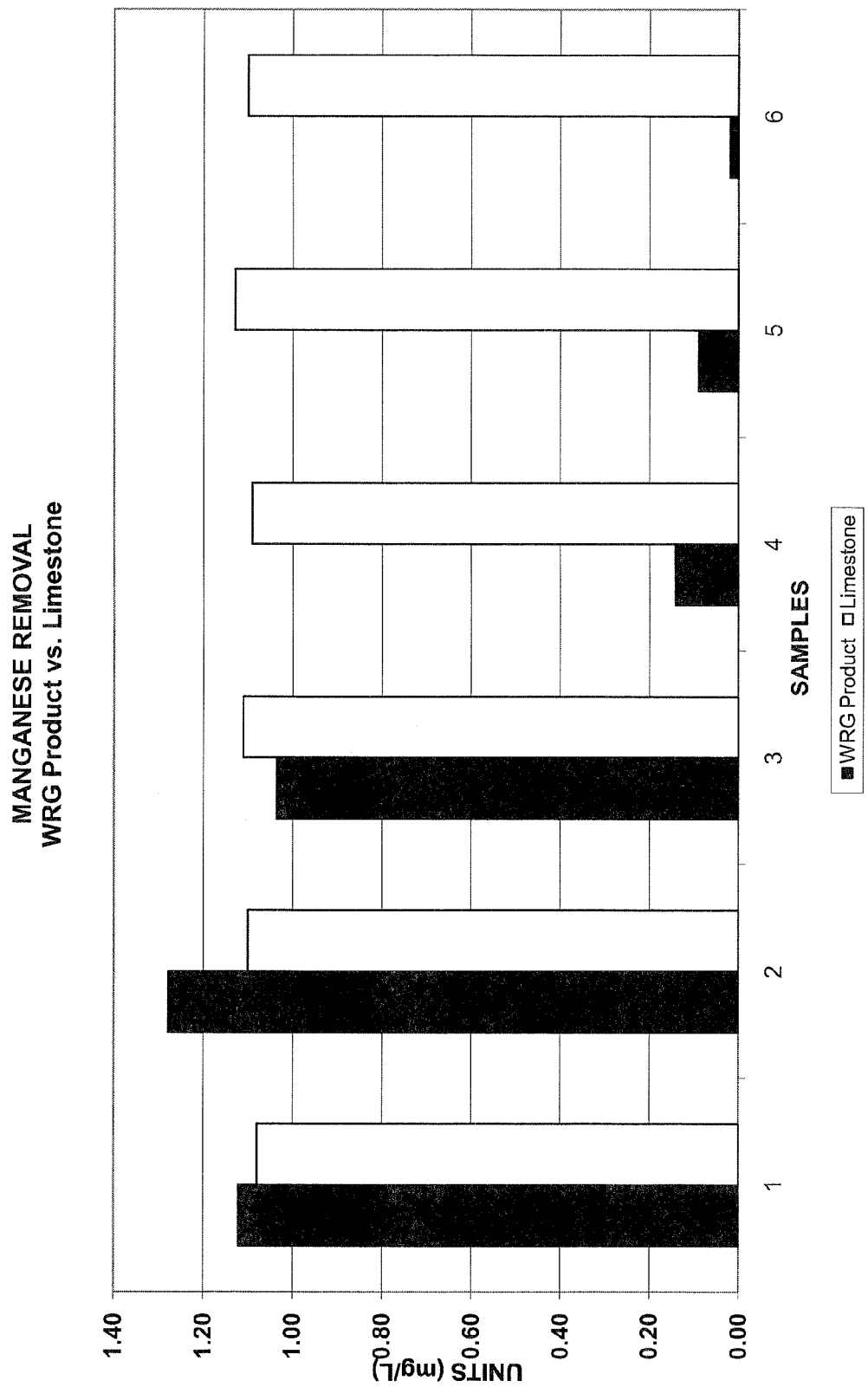

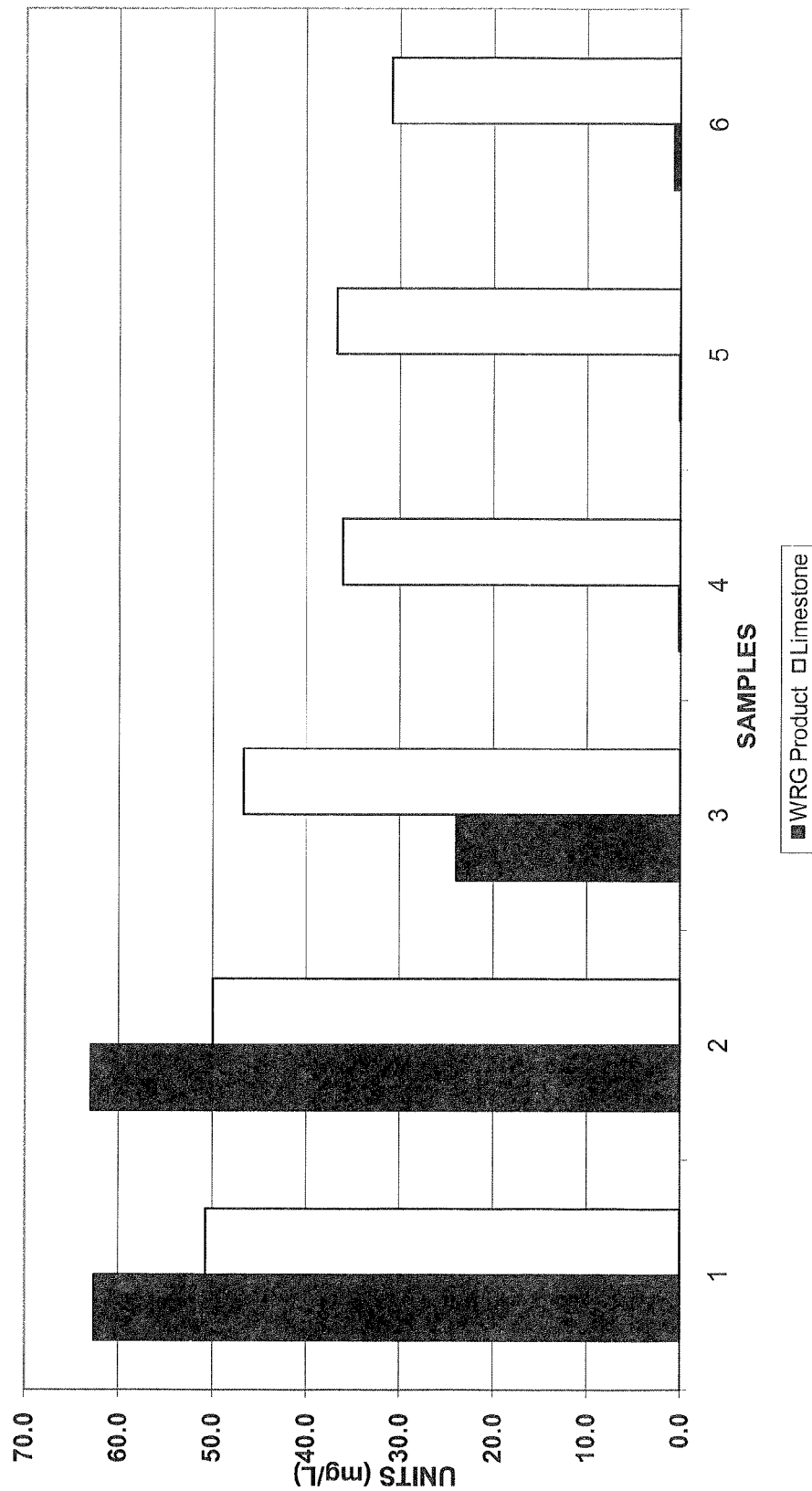
Fig. 5 - SOLUBLE METALS TEST
ALUMINUM REMOVAL
WRG Product VS. Limestone

US 7,883,626 B2

METHOD FOR THE TREATMENT OF ACID MINE DRAINAGE

CROSS-REFERENCE TO RELATED APPLICATIONS

This application is a division of application Ser. No. 12/263,630, filed Nov. 3, 2008, now U.S. Pat. No. 7,784,620 which further claimed benefit of provisional application Ser. No. 60/985,384, filed Nov. 5, 2007, the disclosures of which are herein incorporated by reference.

BACKGROUND

1. Field of the Invention

The instant invention relates to the treatment of acid mine drainage, consisting of a formulation whose main components are waste stream products that produce a feedstock that can be agglomerated into briquettes, blocks or pellets. This formulation creates a hybrid product that can be used in a variety of treatment applications (passive or active treatment) to neutralize acid mine drainage (AMD) in an effective and economical way.

2. Description of the Related Art

Acid mine drainage (AMD) forms when sulfide minerals in rocks are exposed to oxidizing conditions in coal and metal mining, highway construction, and other large-scale excavations. There are many types of sulfide minerals, but iron sulfides common in coal regions, pyrite and marcasite ($FeS_2$), are the predominant AMD producers. Upon exposure to water and oxygen, pyritic minerals oxidize to form acidic, iron and sulfate-rich drainage. The drainage quality emanating from underground mines or backfills of surface mines is dependent on the acid-producing (sulfide) and alkaline (carbonate) minerals contained in the disturbed rock. In general, sulfide-rich and carbonate-poor materials are expected to produce acidic drainage. In contrast, alkaline-rich materials, even with significant sulfide concentrations, often produce alkaline conditions in water.

Acidity in AMD is comprised of mineral acidity (iron, aluminum, manganese, a metals depending on the specific geologic setting and metal sulfide) and hydrogen ion acidity. Approximately 20,000 km of streams and rivers in the United States are degraded by AMD. Water treatment methods used to eliminate or reduce acidity and heavy metals precipitation from impacted waters can be grouped into two types.

One method is called active treatment. Active treatment involves neutralizing acid-polluted waters with alkaline chemicals. However, the chemicals are expensive, hazardous and the treatment facility is expensive to construct and operate. Six primary chemicals have been used to treat AMD including limestone, hydrated lime, pebble quicklime, soda ash, caustic soda, and ammonia. Each chemical has characteristics that make it more or less appropriate for a specific condition. The best choice among alternatives depends on both technical and economic factors.

The second method is called passive treatment. This technology involves the construction of a treatment system that employs naturally occurring chemical and biological reactions that aid Acid Mine Drainage (AMD) treatment and require little maintenance. Passive control measures include anoxic drains, limestone rock channels, alkaline recharge of groundwater, and diversion of drainage through man-made wetlands or other settling structures. The initial cost of building a passive systems are high, but the long term maintenance of the system are low relative to an active system.

There is a need for a product that incorporates the positive aspects of multiple materials, while minimizing or eliminating the negative properties. Since each AMD situation is different and the treatments are so variable, as follows, this product has been designed to be a hybrid product utilizing a neutralizer and binder component such as steel slag; a dissolution control and filtration component such as an organic material; optionally an oxidizing agent such as calcium peroxide, and a dispersant and neutralizer such as a surfactant. This results in a product allowing for the recycling of waste stream products in an effective, low-cost manner.

SUMMARY

As above, there are a myriad of materials and methods to treat AMD by neutralization. Each has its positive and negative attributes. These attributes include neutralizing effectiveness, material, installation and maintenance costs as well as the hazardous nature an life span of the treatment.

The objective of the instant invention is to create a product that incorporates the positive aspects of multiple materials, while minimizing or eliminating the negative properties. Since each AMD situation is different and the treatments are so different this product has been designed to be a hybrid product. This product allows for the recycling of waste stream products which create an effective low cost neutralizing product.

The formulation of the invention consists of four multi faceted components. The first is the neutralizers and binders, second dissolution control and filtration, third is an oxidizing agent and the final component is a dispersant and neutralizer. Each of these components can be comprised of one or more ingredients and the percentage of each is determined by the treatment and agglomeration requirements.

Accordingly, the instant invention, which can be engineered to be site specific, comprehends an agglomeration for neutralizing acid mine drainage, comprising a neutralizer and binder component consisting of steel slag in an amount of 75% to 95% by weight of the agglomeration, a sodium carbonate selected from the group consisting of soda ash and pulp liquor in an amount of 0.5% to 25% of the agglomeration, and, optionally, a lime component selected from the group consisting of limestone sand and slag. Further included is a dissolution control and filtration component consisting of an organic material in an amount of 0.24% to 15% by weight of the agglomeration selected from the group consisting of recycled newsprint, sphagnum peat moss, and sawdust. Next is a dispersant and neutralizer component consisting of a surfactant in an amount of 0.01% to 0.075% by weight of the agglomeration. In situations where there are high levels of manganese, the agglomeration further may comprise an oxidation component consisting of an oxidizing agent in an amount of up to 15% by weight of the agglomeration selected from the group consisting of calcium peroxide, potassium permanganate, and hydrogen peroxide.

BRIEF DESCRIPTION OF THE DRAWINGS

FIGS. 1-5 show test results related to the neutralizing efficiency of the instant invention for some samples and a comparison of some samples of the instant invention with the effects of limestone.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated agglomeration, and such further applications of the principles of the invention illustrated herein, as would normally occur to persons skilled in the art to which the invention relates. This detailed description of this invention is not meant to limit the invention, but is meant to provide a detailed disclosure of the best mode of practicing the invention.

Slag is defined as the solid material resulting from the interaction of flux and impurities in the smelting and refining of metals. The solid product generally forms a silicate glass-like material, which is primarily nonmetallic.

In making iron or steel, iron ore or scrap metal are melted in combination with limestone, dolomite or lime. Pure iron is soft, bends easily under loads and has only limited uses. Adding small amounts of carbon, nickel, manganese and other elements convert the iron into various alloys of steel. There are hundreds of grades of iron and steel, ranging from pig iron, basic carbon steel to high grade stainless steel, with each producing slags having unique properties.

Steel making begins by reducing metal oxides (removing oxygen) in the melt to pure iron metal, while scavenging ions such as aluminum, silicon and phosphorus. The latter three elements cause problems in steel making because they cause the steel to become weak, brittle or otherwise difficult to roll into sheets in a predictable way. These elements make it nearly impossible to make anything useful out of iron.

Fortunately, iron's imperfections could be controlled by adding limestone or dolomite. These calcium compounds combine with aluminum, silicon and phosphorus to form slag. Slag floats to the top of the melt, is poured off and placed in piles for disposal. Slag starts its life at about 2,700 degrees F. and cools almost immediately. The slag cools so quickly, in fact, that very few crystals form. Rather, the slag solidifies as an amorphous, glass-like solid ranging from fine sand particles to large blocks, both of which can be extremely hard.

The finest fraction (–⅛ in.) is the one of particular interest for acid mine drainage (AMD) treatment. This product is referred to as slag fines. Some slag fines are further refined using processes involving jaw and roll crushers and floatation (crushing process). As herein defined this dining "process" involves grinding and a hydraulic separation processes. The fine grinding and flotation further remove metals, which are imbedded in the glassy matrix. This process produces a slag that is the particle size of powdered lime.

Steel slags are calcium alumino-silicate oxides. Since they form at the melting point of iron (>2,700 degrees F.), most compounds with lower boiling points have been driven off. These compounds contain elements like sulfur, selenium, carbon, cadmium, lead, copper, and mercury. Most of the residuals are encased within a glassy matrix. Fortunately, the matrix is soluble and releases calcium and manganese oxides, which can drive the Ph of the dissolving fluid to 10 or 11.

Since slag is a coarse glass, it will maintain high permeability (~$4.5 \times 10^{-2}$ cm/sec) regardless of how much water has passed through it. The permeability of this material can be reduced if it is compacted or ground up into smaller particles. This causes the material to be much finer and barely lets any water pass through (permeability is ~$1.0 \times 10^{-6}$ cm/sec). Unlike lime, steel slags do not absorb $CO_2$ from the air and convert back to relatively insoluble limestone according to the reaction:

$$Ca(OH)_2 + CO_2 \dashrightarrow CaCO_3 + H_2O.$$

This is an extremely important property, since it means slag can be left outside, exposed to the atmosphere for years, and still achieve high levels of alkalinity upon dissolution. The neutralization potential (NP) of steel slags range from 45 to 78%. Most of the residuals are in the form of aluminosilicates and iron oxides.

Column leaching studies were performed with various thicknesses of –⅛ inch IMS slag from Mingo Junction, Ohio. Two-inch diameter columns were filled with slag to thicknesses ranging from 4 to 24 inches. Four times each day, 0.5 L of de-ionized water was poured through these columns for five days (giving 20 leachings per week). Leachings were not performed on weekends. This leaching procedure occurred over a period of three months.

After pouring the water into the columns, leachate was collected and a water sample was taken from the collected leachate. Leachate samples were analyzed for pH, electrical conductivity, alkalinity concentration, and metals. Alkalinities are given as mg/L $CaCO_3$ equivalent.

Water Ph of leachate was 11.7 and alkalinity averaged 1,450 mg/L. FIG. 1 summarizes the alkalinity concentration of the leachate samples over time with 12- and 24-inch thick slag columns. The results can be related to the leaching procedure (constant leaching for 5 days, followed by a 2 day wait). The highest levels of alkalinity were found on the Monday leachate samples (the peaks on the graphs) because the slag had time to dissolve and accumulate alkaline products during the weekend when leaching was suspended.

The 12-inch-thick layer of slag produced initial alkalinities of 2,000 mg/L, and these alkalinity concentrations gradually declined as more water was flushed through the system. At the lowest points (toward the end of the week after constant leaching), alkalinities of about 100 mg/L were found. The 24-inch-thick layer of slag produced similarly high initial alkalinity concentrations and the decline in alkalinity over time was much slower. Even after 100 L of water had flowed through the 24-inch-thick slag column, the alkalinity was still in the 1,750 mg/L range.

Alkalinity in the leachate declined over time due to the dissolution of the finer slag particles, leaving only larger particles in the column for reaction. Larger particles provide less surface area, which in turn give less reaction time and alkalinity production.

As mentioned, concentrations of about 100 mg/L were reached, which showed no tendency to decrease further.

In comparison, crushed limestone leached in a similar way yielded alkalinities near 5 mg/L. In order to reach its maximum alkalinity of 80 mg/L (under open conditions), water had to be in contact with the limestone for about 12 hours.

In general, steel slag yielded more alkalinity than equal weights of limestone (from 500 to 2,000 mg/L compared to 60 to 80 mg/L). Hydrated lime or quicklime will yield similar alkalinities as steel slag for a short period, but these lime products expand when wet, seal off and allow little permeability, and gradually turn into limestone. In order to be effective in a leaching application, lime products need periodic agitation.

Since most steel slags contain heavy metals, extensive leaching tests were performed with slags. It is important to remember that all steel slags are not the same; they vary in composition, quality, and fineness. Nonetheless, similar steel-making processes (like basic steel vs. specialty or stainless steels) should produce slags that are comparable.

In general, basic steel slags have lower concentrations of metals than specialty steel slags that often add other metals for specific purposes. Reprocessed slags have even lower concentrations of metal than basic steel slags.

Deionized water was passed through a 2-inch diameter by 24-inch long column of Mingo Junction steel slag fines. The leachate metal concentrations were compared to metal standards for the U.S. Environmental Protection Agency's Toxicity Characteristic Leaching Procedure (TCLP) and to EPA's drinking water standards. The results indicate that the slag did not release any element in quantities higher than TCLP limits. As for drinking water standards, other than high Ph and alkalinity, only Ni was above the EPA drinking water standard. The Ni concentration in leachate was 41 ug/L versus the drinking water standard of 10 ug/L.

The same slag was subjected to a TCLP test, which included extracting metals from the slag with a weak acetic acid leaching solution while being shaken for 18 hours (standard EPA procedures). All of the metals listed under leachate parameters in TCLP were below the maximum allowable limits, and most of the metals were below detection using an analytical instrument commonly used for measuring metals in solution (ICP-AES).

Given the amount of alkalinity in steel slag, few metals were expected to be mobilized unless the leaching medium became extremely acid or continued leaching eventually exhausted the alkalinity in the slag material. To check the release of metals in an acid situation, an acid-producing coal refuse was amended with 2% and 4% slag for neutralization (these rates represent only one quarter to one half the amount of neutralizing material needed to neutralize the acid that is produced from the refuse). The two slags used in this study, J&L and CarTech, were from specialty steel mills. As expected, most of the columns leached acidic water. Nonetheless, the leachate concentrations were, in nearly every case, less than that from the untreated refuse. Nickel and manganese, two important elements, both increased in leachates from refuse treated with slag compared to leachate from untreated refuse.

The instant invention thus is a product that incorporates the positive aspects of multiple materials, while minimizing or eliminating the negative properties. Since each AMID situation is different and the treatments are so different the product has been designed to be a hybrid product. This product allows for the recycling of waste stream products which create an effective low cost neutralizing product.

Accordingly, based on the above studies, the formulation of the invention consists of four multi-faceted components. The first is the neutralizers and binders, second dissolution control and filtration, third is an oxidizing agent and the final component is a dispersant and neutralizer. Each of these components can be comprised of one or more ingredients and the percentage of each is determined by the treatment and agglomeration requirements based on sample testing.

Before the agglomeration can be sized, a calculated acidity and a lab or field-determined alkalinity can be used to calculate a net acidity value of the water sample by subtracting the alkalinity value from the calculated acidity value. In the preferred embodiment, a software program and prediction model known as AMDTreat developed by the U.S. Office of Surface Mining can help predict and model treatment and treatment costs. Using the program then the user can enter the water quality and quantity data and "build" the instant agglomeration using the herein disclosed treatment components. Users can customize each agglomeration to site-specific conditions by controlling the size, quantity, and unit cost of the below components. Many tests and experiments have revealed the following optimized, best mode for practicing the invention.

A. Neutralizer and Binder Component

The Neutralizer and Binder component consists of the listed ingredients which have the following properties and the percentages used (all percentages are by weight).

1. Finely processed specialty steel slag—sizing of 200 mesh down, 75%-95% of formulation with a neutralizing potential (NP) of 78%. As stated before basic steel slag is highly reactive in neutralizing AMD and has along life span. Finely processed specialty steel slag is extremely low in residual metals and has a higher concentration of pre-calcined lime than basic steel slag.

Normally the fine particle size is detrimental to the material because of its lack of permeability. The fine particle size inhibits its use in treating AMD due to this lack of permeability. The lack of permeability causes a cementatious layer to develop and shuts down the neutralizing ability of the material. When finely processed specialty steel slag is used in conjunction with a sodium carbonate ingredient, the dissolution and filtration components as well as the dispersant and neutralizing component produces a product that is permeable and will dissolve over time. By agglomerating it into briquettes, blocks or pellets that dissolve with water, contact allows for nearly 100% of its neutralizing ability to be obtained.

These characteristics allow for nearly 100% utilization of neutralizing potential of the slag which pound for pound makes the product geometrically superior to limestone whose low solubility and tendency to develop an armor coating a far inferior material. This ingredient is not hazardous as are many of the chemicals used in the active treatment of AMD and is relatively inexpensive, making it a premier ingredient to use. Finely processed specialty steel slag is less expensive and has a far greater neutralizing potential than limestone.

2. Blast Furnace Slag Fines/Limestone Sand—sizing ¼ inch down, 0%-75% of formulation, with a NP (neutralizing potential) of 72%. Blast furnace slag fines contain less residual metals compared to Basic Steel Slag yet it retains the high CaO (lime) found in steelmaking slags. This ingredient is used primarily for its physical size (as well as neutralizing ability). The sizing allows the end products strength and dissolution rate to be controlled. Limestone sand can be substituted for blast furnace slag where material and transportation costs are high. Blast furnace slag fines/limestone sand are used as the aggregate which allows the ingredients to be formed into briquettes, blocks or pellets, termed herein "agglomeration". The percentage of aggregate varies with the type of product being manufactured. The slag fines/and increases the permeability of the product and the neutralization of the AMD.

3. Sodium Carbonate Based Ingredient—Light or dense Soda Ash/spent Pulp Liquor sizing 200 mesh powder or ¼ inch flakes, 0.5%-25% of the formulation with a NP of 60%. The soda ash is a quick acting neutralizer but is expensive to use. In combination with the contained lime in the slags it also acts as a binder in the agglomeration process.

The high solubility of the soda ash also enhances the dissolution of the product. Using this ingredient in smaller percentages off-sets the high cost of the ingredient and keeps the finished product cost competitive. The use of a sodium carbonate based product in conjunction with the CaO (lime) contained in the slag allows the binding of the ingredients into an agglomerated product.

The sodium carbonate based product (light or dense soda ash/spent pulp liquor) aids in the rapid neutralization of AMD and in the permeability and dissolution of the product.

The spent pulp liquor can be used in combination with the soda ash or as a substitute. Pulp liquor contains 9%-12% sodium carbonate as well as organic material in the form of cellulose. These characteristics allow the ingredient to work as a neutralizer, a binder and aids in the dissolution rate of the product.

B. Dissolution Control and Filtration Component

Organic Material such as recycled newsprint, sphagnum peat moss and/or sawdust can be used individually or in any combination. In the product it can be used from 0.25%-15% of the overall formulation. The dissolution of the agglomerated product is controlled by the addition of the organic material. During production the organics works as an aggregate, but after curing the organics due to their hydroscopic nature aids in the permeability and dissolution of the finished product. The organic material also acts as a filtering agent as it does natural and man made wetlands. In other words, the organic material also acts as a filter, as it does in Constructed Wetland sand aids in the removal of metals from the AMD. Thus, the addition of organic material enhances the permeability of the product and aids in the control of the dissolution rate. The controlled dissolution of the product is essential in the complete utilization of the neutralizing potential of each ingredient.

C. Oxidation Component

Oxidizing agents such as calcium peroxide, potassium permanganate, and hydrogen peroxide can be used in the formulation. The oxidizing content of the formulation can run from 0.0%-15% in the total formulation. The addition of an oxidizing agent to the formulation enhances the ability of the product to precipitate the contained metals specifically manganese. Accordingly, the oxidizing agents are only used in situations where the AMD contains high level of manganese (Mn) relative to the iron (Fe) content. In these situations the oxidizing agent will enhance the precipitation of the metals specifically the manganese from the AMD.

D. Dispersant and Neutralizer Component

A surfactant comprises 0.01%-0.075% of the formulation. The surfactant, as are most of the other ingredients, is multi-faceted. The addition of a dispersant in the manufacture of agglomerated products greatly enhances the permeability of the product and aids in the neutralization of the AMD. In the production phase it acts as a dispersant, breaking the surface tension of the material allowing faster and more complete mixing of the material. In use the surfactant is a neutralizer and enhances the permeability of the agglomerated product. The permeability of the product is crucial to the neutralizing ability and dissolution rate of the product.

We claim:

1. A process for neutralizing acid mine drainage, comprising the steps of:
    calculating a net acidity value for a sample of said acid mine drainage;
    inputting said net acidity value and water quantity data into a prediction model; and,
    formulating and contacting said acid mine drainage with a mixture comprising:
        a neutralizer and binder component consisting of specialty steel slag, a sodium carbonate selected from the group consisting of soda ash and pulp liquor, and optionally a lime component selected from the group consisting of limestone sand and blast furnace slag fines;
        a dissolution control and filtration component consisting of an organic material selected from the group consisting of recycled newsprint, sphagnum peat moss, and sawdust; and,
        a dispersant and neutralizer component consisting of a surfactant.

2. The process of claim 1, further comprising the step of contacting said acid mine drainage with an oxidation component consisting of an oxidizing agent in an amount of up to 15% by weight of said mixture selected from the group consisting of calcium peroxide, potassium permanganate, and hydrogen peroxide.

3. The process of claim 1, wherein said neutralizer and binder component has a neutralizer potential of 78%.

4. The process of claim 1, wherein said steel slag is a plurality of finely processed particles formed at least as a 200 mesh powder.

5. The process of claim 1, wherein said lime component contains particles sized than one-quarter of an inch.

6. The process of claim 5, wherein said lime component has a neutralizing potential of 72%.

7. The process of claim 1, wherein said sodium carbonate is sized in the range of a 200 mesh powder to one-quarter inch flakes.

* * * * *